Patented Oct. 25, 1927.

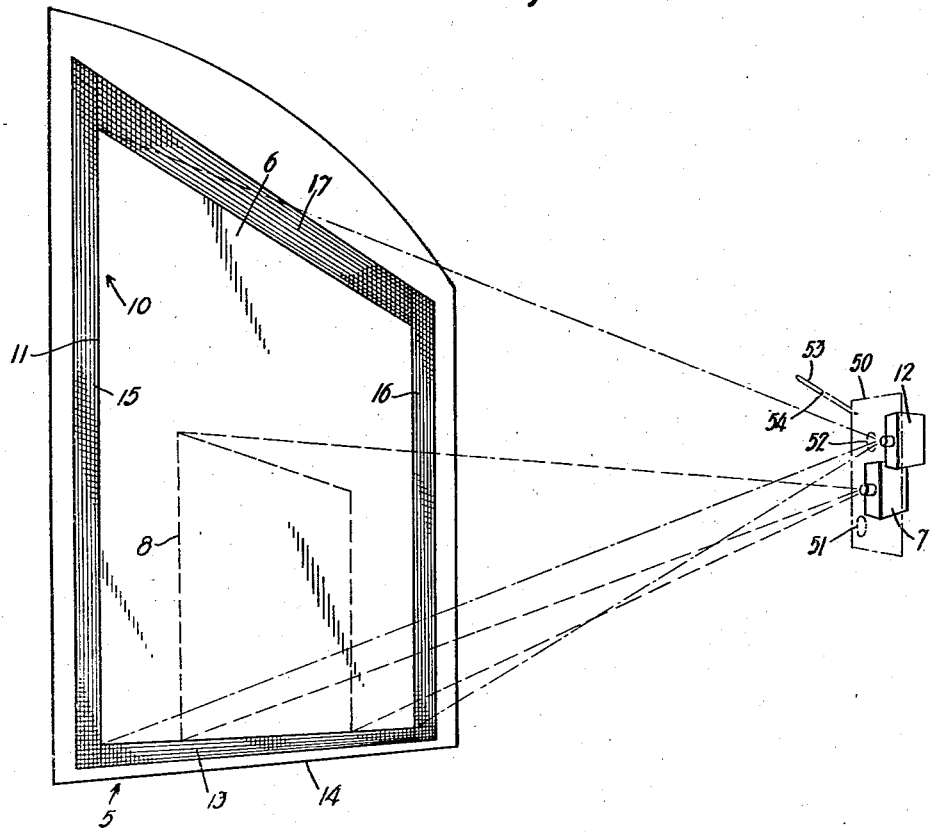

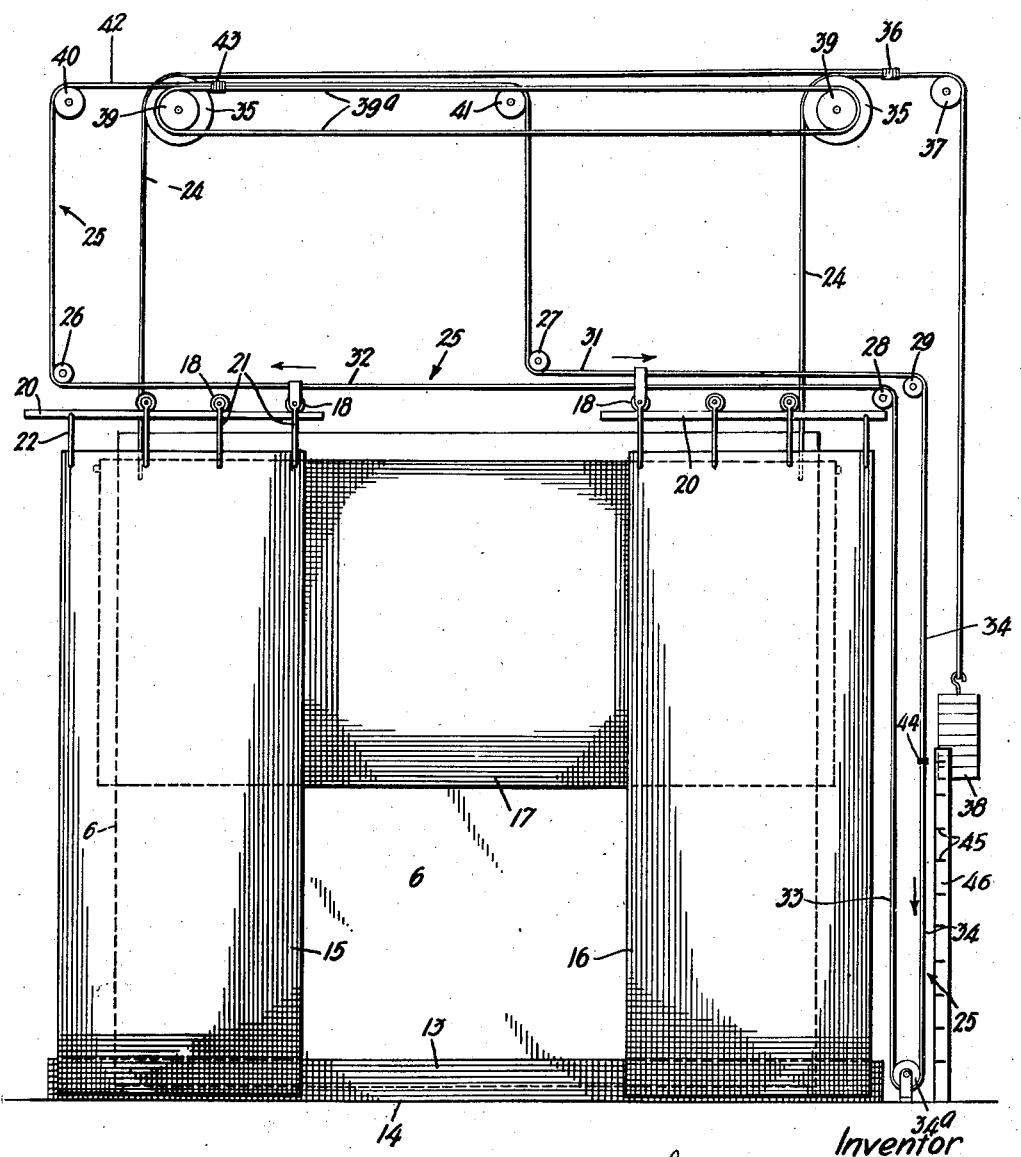

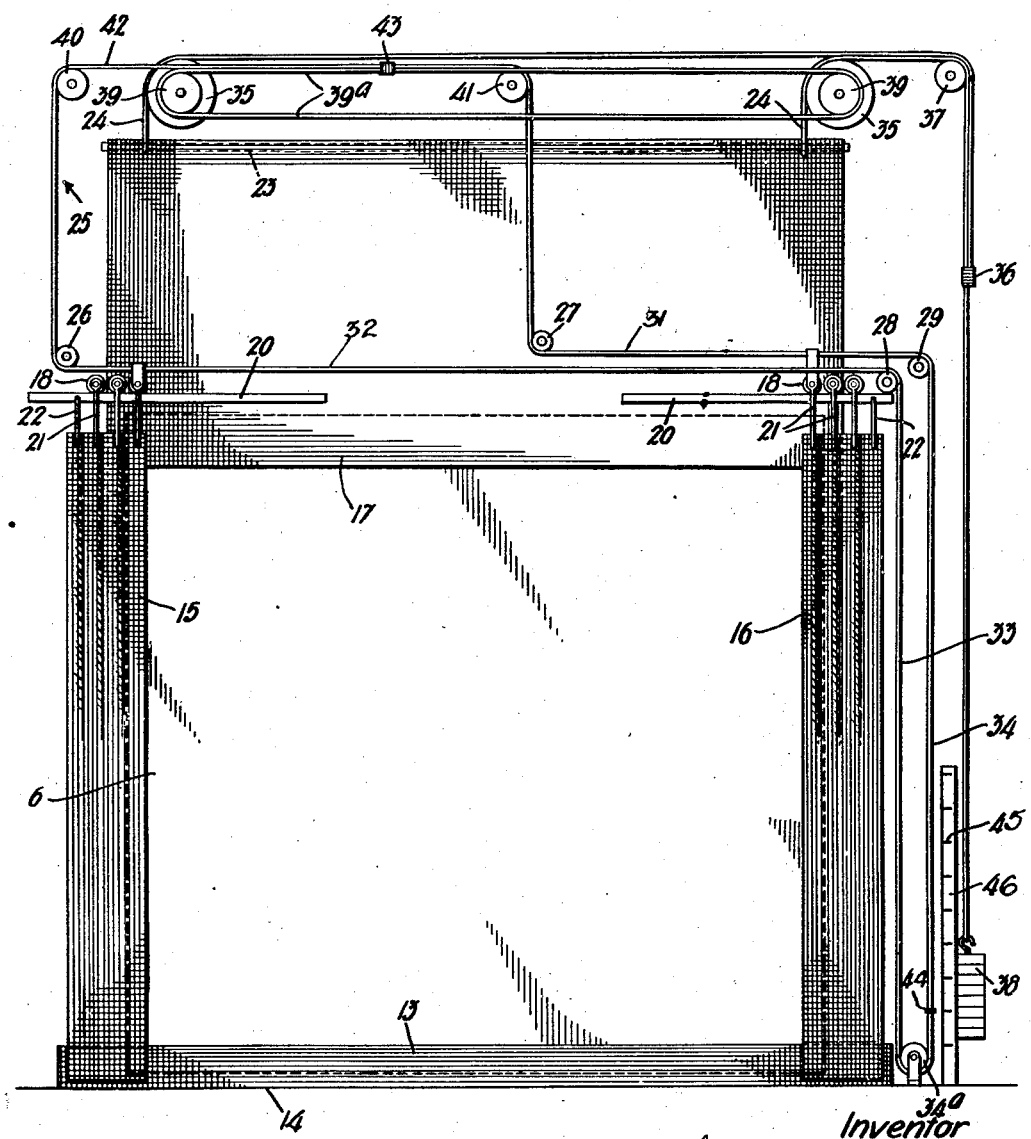

1,646,855

UNITED STATES PATENT OFFICE.

LORENZO DEL RICCIO, OF NEW YORK, N. Y.

MOTION-PICTURE EXHIBITING.

Application filed January 4, 1927. Serial No. 158,875.

My present invention relates to motion picture exhibiting and more particularly it is concerned with a system of exhibiting motion pictures which permits of varying the size of the projected images of the film on the screen whereby certain novel effects are produced.

In the embodiment of the invention herein disclosed and at present preferred by me I employ a screen of larger than usual size, which I equip with a system of masks by means of which only a portion of the screen is exposed, when the masks are in their limiting position of occluding the screen. I then provide a projection apparatus which will throw an image fitting the unmasked portion of the screen and also a second projection apparatus designed to throw an image fitting the full size of the screen. By means of further apparatus for simultaneously cutting in one machine and cutting out the other, I am thus enabled to use, for example, first the smaller image machine with the partially masked screen and then the large screen area with the larger image machine. When such a change is desired, depending upon the nature of the film being exhibited, I may first fill in the smaller screen area with a portion of the larger image (using the larger image projection machine) and then by gradually unmasking the unexposed screen area produce a novel and striking effect both while the masks are being withdrawn and when the larger image is fully exposed. In the case mentioned the masks used will preferably have their outer surfaces of dark, substantially non-reflecting material, whereby the portion of the larger image temporarily thrown thereupon will not be visible to the audience.

In the embodiment described below I have shown means for producing two sizes of images only, but it is obvious that three or more sizes of images may be employed if desired. Referring now to the drawings, Figure 1 is a perspective view illustrating the screen and the mask on a stage and showing two machines for projecting pictures upon the screen.

Figure 2 is a front view of the device showing the masks set to expose a small area of the screen.

Figure 3 is a view similar to Figure 2 but shows the mask sections shifted to present a larger area of the screen.

Upon a stage 5 there is located a white screen 6 upon which pictures may be thrown by a projection machine 7 to a comparatively small area 8, Figure 1. A black mask 12 is provided to cover the unused portion of the screen.

While projecting motion pictures it is desirable to change the area 8 to increase it to a larger area 11 so that a larger picture may be projected from another projection machine 12.

Provision is herein made to change the area of the screen according to the size of the picture to be projected upon it. To this end the mask 10 may include four border sections, namely a bottom section 13, which may be stationary and supported on the floor 14 of the stage 5 in any convenient manner, two side sections 15 and 16, and a top section 17, the side sections 15, 16 and the top section 17 being movable to vary the area of the exposed portion of the screen.

To facilitate the moving of the sections 15 and 16 they may be in the form of curtains each supported from rollers 18 which run on a fixed rail 20 suitably supported. From the rollers extend hangers 21 to which the curtains are secured; a fixed hanger 22 being provided to support the outer end of the curtain. The inner ends of the side curtains are movable towards and away from each other by means hereinafter described to vary the width of the exposed area of the screen.

The top section 17 of the mask may be in the form of a horizontally disposed curtain which may be suspended from a pole or horizontal bar 23 which is carried by ropes 24 by means of which the curtain 17 may be raised or lowered as hereinafter described to vary the height of exposed area of the screen 6.

The means to operate the side curtains 15 and 16 may include a continuous band or belt 25 which may be composed of rope or chain; said belt being guided above said curtains by guide rollers 26, 27, 28 and 29 in two parallel reaches 31 and 32 which move in opposite directions. From the rollers 28 and 29 the belt extends downwardly in two reaches 33 and 34 around a guide roller 34ª which may be secured to the stage floor 14 in any convenient manner. By pulling down on the reach 34 of the rope 25 (Figure 2) the reaches 31 and 32, at the top of the curtains, move in opposite directions as indicated by the arrows. The two end hangers 21 which support the inner ends of the side curtains are secured to the reaches 31 and 32 and consequently when the said reaches are operated by a downward pull on the reach 34 the curtains are moved away from each other, thus increasing the width of the screen as desired.

The ropes or chains 24 which support the mask section 17 are conducted over pulleys 35 and are connected to each other at 36, one of said ropes may extend over a guide roller 37 and has connected thereto a counterweight 38 to facilitate raising and lowering the mask section 17.

To operate the pulleys 35, each may be provided with a pulley 39 secured to the pulley 35, and a rope of chain belt 39ᵃ connects the pulleys 37. By operating the belt 38 in a manner hereinafter described the mask section 17 may be raised or lowered at will.

It is desirable to move the side section 15, 16, and the top section 17 of the mask simultaneously. To this end the belt 25 may be conducted over guide rollers 40 and 41 to form a reach 42, so that it may be connected to the belt 38 as at 43, so that when the belt 25 is actuated to operate the side sections 15 and 16, the top section 17 is also operated.

It will be understood that the top section 17 travels a greater distance in the same period of time, than either of the side masks 15 and 16. Accordingly the actuating pulleys 35 for the section 17 are of greater diameter than the driving pulleys 37.

To indicate when the mask sections have been moved to the desired positions an indicator 44 may be provided on the belt 25 which may be brought into register with anyone of a series of graduation marks 45 on a scale 46.

In Figure 1 I have indicated diagrammatically the arrangement of projection machines and also the shutter mechanism. As shown in said figure, and as has already been mentioned, projection machine 7 is equipped to throw an image of the picture to fit the small area 8, while the second projection machine 12 is adjusted to throw a clear image of the same sized film upon the large area 11 of the screen. For the purpose of rapidly shifting from the small image on the screen to the large image, a shutter 50 is provided having apertures 51 and 52 such that vertical movement of the shutter of the proper amount will shut off the light from one machine, and allow it to pass to the screen in the case of the other. Preferably movement of the shutter 50 is effected by electrical means which may be operated at a point remote from the projection apparatus. Manual means for operating shutter 50 are shown in the handle 53 of rod 54 attached to said shutter.

In the operation of my device, when it is desirable to shift from the small image to the large or vice versa, the second projection apparatus to be called into play will have previously been lighted up and equipped with the film which is to be shown. When the change is to be made from the smaller to the larger image, it is usually preferable first to project the larger image within the smaller area 8 preparatory to shifting the masks, although this procedure may be varied as desired. In such a case the shutter 50 will be actuated to cut in the machine 12 and cut out the machine 7. In this case, it will usually be desirable to have the mask withdrawn slowly and the larger image thus to fill in the screen area as exposed. I preferably accomplish this by making the mask material of dark non-reflecting material whereby the image cast thereon by the projection apparatus 12 will not be apparent to the observer, as has been stated.

What I claim is:

1. In an apparatus for exhibiting motion pictures, a screen, a mask for said screen such as to leave a portion of the screen exposed, means for projecting a plurality of different sized film images on the screen, and means to cut out an image of a size fitting said exposed portion of the screen, and to cut in an image of a larger size and means for withdrawing said mask so as to expose a screen area fitting said larger image.

2. In an apparatus for exhibiting motion pictures, a screen, a mask for said screen such as to leave a portion of the screen exposed, a projection machine focusing an image fitting said exposed portion of the screen, a second projection machine focusing an image fitting the screen area with the mask removed, means for cutting in one machine and cutting out the other and means for withdrawing said mask so as to expose a screen area fitting said larger image.

3. In an apparatus for exhibiting motion pictures the combination of a projection screen, a mask for said screen, said mask including four sections namely a stationary bottom section, a top section and two side sections, said sections having an initial position in which they define an initial projection area of the screen, and means to simultaneously move the side sections away from each other and the top section away from the bottom section to increase the exposed area of the screen so that a larger picture may be projected upon said screen.

4. In an apparatus for exhibiting motion pictures the combination of a projection screen, a mask for said screen, said mask including three sections namely a top section, and two side sections, said sections having an initial position in which they define an initial projection area of the screen, said sections being movable to vary the exposed area of the screen so that pictures of various sizes may be projected on said screen, means to operate the side sections, means to operate the top section, and means connecting the operating means for the top section with the operating means of the side sections so that all of said sections may be moved simultaneously to vary the exposed area of the screen.

5. The combination of a projection screen, a mask therefor, said mask including a plurality of sections to form the border of an exposed portion of the screen, means to operate said sections simultaneously to vary the area of the exposed portion of the screen, and means connected with said operating means to indicate the position to which the screens are moved.

6. In a system of exhibiting motion pictures in which means are used for projecting film images of different sizes upon a screen whereby each image is included within the next larger image and in which the region of the screen included in the overlap is masked, the method which consists first in exhibiting the pictures using a smaller image size while masking the unused portion of the screen, then exhibiting the larger images and withdrawing the masks whereby when said masks are withdrawn said larger images will substantially fill the then unmasked portion of the screen.

7. In combination, two screen areas of different sizes, the smaller of said screen areas being contained within the larger, means to project an image fitting the smaller of said screen areas, means for projecting an image fitting the larger of said screen areas and means for simultaneously cutting in one and cutting out the other of said images.

8. In the method of exhibiting motion pictures, the steps which consist in projecting motion picture images to a given scale of projection upon a screen and simultaneously cutting out said projected images and cutting in motion picture images to a greater scale of projection and increasing the projected area on the screen.

9. The method of exhibiting motion pictures which consists in projecting upon a screen, images of the film being exhibited, said images being of a given size, simultaneously cutting out said images and cutting in images of greater size, masking down said larger images to approximately the screen size of said first images and unmasking said larger images to substantially their full size.

10. The method of exhibiting motion pictures which consists in projecting upon a screen, images of the film being exhibited, said images being of a given size, simultaneously cutting out said images and cutting in images of greater size while intercepting the cone of light from the projection device with a mask so as to reduce the size of the projected picture to approximately that of the screen size of first images and withdrawing such mask until substantially the full size of the larger images is reached.

11. In combination, two screen areas of different sizes, the smaller of said screen areas being contained within the larger, masking means for changing from one screen area to the other screen area, means to project an image fitting the smaller of said screen areas, means for projecting an image fitting the larger of said screen areas and means for simultaneously cutting in one and cutting out the other of said images.

In testimony whereof I have affixed my signature to this specification.

LORENZO del RICCIO.